Nov. 17, 1970  KEIJI TSUJIHATA ET AL  3,541,603
APPARATUS FOR CONTINUOUS BAKING OF POWDERED OR GRANULAR RAW
MATERIALS FOR PRODUCING IRON AND FOR PRODUCING COKE
Original Filed Aug. 16, 1965  7 Sheets-Sheet 1

Keiji Tsujihata and
Yasuhiro Sawada,
Inventors

By Wadsworth, Land & Ponack,
Attorney

Nov. 17, 1970   KEIJI TSUJIHATA ET AL   3,541,603
APPARATUS FOR CONTINUOUS BAKING OF POWDERED OR GRANULAR RAW
MATERIALS FOR PRODUCING IRON AND FOR PRODUCING COKE
Original Filed Aug. 16, 1965   7 Sheets-Sheet 7

United States Patent Office 3,541,603
Patented Nov. 17, 1970

3,541,603
APPARATUS FOR CONTINUOUS BAKING OF POWDERED OR GRANULAR RAW MATERIALS FOR PRODUCING IRON AND FOR PRODUCING COKE
Keiji Tsujihata, Tokyo, and Yasuhiro Sawada, Kawasaki, Japan, assignors to Nippon Steel Corporation, Tokyo, Japan
Continuation-in-part of application Ser. No. 693,781, Dec. 27, 1967, which is a division of applications Ser. No. 479,816, Aug. 16, 1965, and Ser. No. 488,342, Sept. 30, 1965, now Patent No. 3,370,937. This application Aug. 5, 1968, Ser. No. 756,340
Claims priority, application Japan, Aug. 18, 1964, 39/47,304; Sept. 22, 1964, 39/54,264
Int. Cl. F27b 21/06; C10b 7/02, 33/02
U.S. Cl. 266—21                                      10 Claims

ABSTRACT OF THE DISCLOSURE

An apparatus for continuous baking of powdered granular raw materials for producing iron, or for producing coke, which comprises, in combination, a hood, a device on top of said hood for charging a powdered granular material and a further device on top of said hood for discharging the exhaust gas produced by baking the powdered granular material, an annular furnace body rotatably mounted under said hood in airtight engagement with the hood and having a chamber for baking powdered granular material, a conveying device provided under the bottom annulus of said furnace body and movable synchronously with the rotation of the furnace body and having a large number of air holes therein and being inclined downwardly in the direction of rotation of the furnace body, and a material cutting device provided at the low end of the inclined conveying device.

---

This application is a continuation-in-part of our copending application Ser. No. 693,781, now abandoned, filed Dec. 27, 1967, which in turn is a division of our copending application Ser. No. 488,342 filed Sept. 20, 1965, now Pat. No. 3,370,937, and our copending application Ser. No. 479,816, now abandoned, filed Aug. 16, 1965.

This invention relates in general to an apparatus for continuous baking of powdered or granular materials, and more particularly to a process for continuous baking of such raw materials for producing iron as powdered ores and pellets, and for producing coke from coal.

The heretofore widely known apparatus for sintering powdered or granular raw materials, for example, powdered iron ores, are of the Dwight Lloyd type, the Greenawalt type, and so on.

Most gas recoving type dry-distilling ovens for coke which have been generally adopted for powdered or granular raw material baking apparatus, for example, coke producing apparatus, are noncontinuous. Typical of them are the Nittetsu type (Japan), the Otto type and the Coppers type. In such conventional noncontinuous coke ovens, when a coal charge has been dry-distilled in a baking chamber so as to be changed to coke and the coke has been discharged out of the chamber, because the oven is noncontinuous, the baking chamber will become empty and the temperature in the baking chamber will quickly fall. Further, in case the emptied baking chamber is to be charged with raw material, i.e. coal, the chamber will be filled with the raw material coal at once, the temperature of the side walls of the baking chamber will quickly fall to be about the temperature of the raw material. Therefore, the efficiency of the operation will be greatly reduced.

Almost all of these types of apparatus employ the baking process based on downward suction, accordingly having a large heat loss. That is to say, when the raw material charge consisting of a powdered ore containing a fuel is introduced onto the grate in one of the sintering machines and is ignited by an igniting furnace and the gas is exhausted by downward suction, air passes downwardly through said raw material charge and causes the fuel contained in the raw material to burn, thus sintering the powdered ore. The sintering is completed when said burning has reached the surface of the grate, and then, the sinter is discharged. However, some of the sintered ore in the lower layer remains red hot, thus giving rise to a considerable amount of heat loss. On the other hand, the conventionally known furnaces for baking pellets and the like are a shaft furnace and a moving grate type furnace, which is similar to the above stated sintering apparatus. Nevertheless, the prior pellet baking processes are basically the same as the sintering process in the aforesaid sintering apparatus and discharge the sintered pellets in a red hot state, with consequent great heat loss.

The present invention has as an object the overcoming of such a defect as mentioned above for efficient baking of powdered or granular matter and seeks to provide an apparatus for baking powdered or granular raw materials for iron production, specifically, powdered ores, pellets, and so forth, and for producing coke from coal, in an exceedingly heat-economical and continuous manner by the use of an annular rotary furnace.

The present invention is characterized in that a powdered or granular material is continuously charged into an annular rotary furnace in such a way that the powdered or granular material charge forms a plurality of layers continuously and spirally by virtue of the revolution of the rotary furnace; the plurality of charge layers are baked and cooled while successively and continuously descending in accordance with the rotation of the furnace, said baking being carried out by keeping a middle part of said plurality of material layers as burning layers by means of upward draft fed from the lower part of the furnace; and the baked material layers, after being cooled while descending in accordance with the revolution of said rotary furnace, are cut out by means of a conveyer provided on the periphery of the bottom of the rotary furnace so as to be inclined at some angle and to move synchronously with the furnace rotation and a cutting device set between the starting and ending points of the above-mentioned inclination of the conveyer. Thus, the present invention makes it possible to produce baked ores very efficiently.

The features of the present invention will be more fully understood from the following description taken in conjunction with the accompanying drawings, in which.

The embodiment of the present invention shown in FIGS. 1–10 seeks to bake mainly a powdered or granular raw material such as a powdered ore having particles about 0.25 mm. to 3 mm. in diameter, suitable as a sintering material, or pellets, several millimeters in diameter, made of a finely powdered ore which has particles below 0.25 mm. in diameter so as to be suitable as a pelletizing material, and the apparatus embodying the principle of this invention is a vertical and annular rotary furnace for continuous baking with an upward draft.

Figure 10:
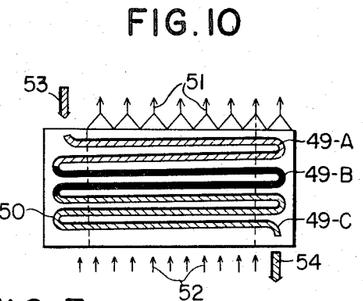
FIG. 10 is a schematic sectional view illustrating the baking process as carried out in the apparatus of FIG. 1.

Referring now to the drawings, and particularly to FIG. 10, the material to be charged is put, as indicated by an arrow 53, into a cylindrical furnace body 50 so as to form spiral layers.

The number of the spiral material layers is preferably 3 to 12, but should not be limited thereof. The layer number must be decided after full inquiry into both draft resistance and productivity.

FIG. 10 shows seven material layers for the sake of simplicity, considering all of the charged material layers, the upper layers are indicated as 49–A and the middle layers, which constitute burning layers, are shown as 49–B.

The lower layer, indicated at 49–C, is cooled so that the material temperature decreases as the layer descends, and the layer just under the burning layers is in a red hot state. It is usually desirable in the furnace of this invention to adjust the temperature of the lowest baked material layer just before its discharge to 300 deg. C. or below. The present invention is characterized by the draft being forced upward as shown by arrows 52 in FIG. 10, or the gas suction directed upward as shown by arrows 51, and the cold air passes through the layers of the ore baked as described above, cooling the baked ore layers, namely, being heated by said layers, and therefore, the temperature of the air thus heated is fairly high when the air reaches the burning layers. Consequently, the thermal efficiency is very high and the fuel consumption is remarkably low. In addition, the fuel containing material to be baked has only to be ignited once around the annulus, and because the position of the burning layers is always adjusted so as not to allow the fire to be extinguished, it is not necessary to repeat ignition. Therefore, the igniting fuel needs to be used only at the beginning of the burning so that the fuel consumption is remarkably low. Moreover, the upward draft system allows the fan ventilating pressure to be low, and further the cylindrical shape of the furnace requires only a small plant site, thus, the present invention contributes greatly also to the improvement of furnace equipment and installation.

As will be understood from the foregoing description, the apparatus according to the present invention is entirely different from the conventional ones and remarkably high in efficiency. An exemplary apparatus of this invention will hereunder be described in connection with FIGS. 1 to 3. The reference numeral 1 designates a rotary cylindrical furnace body, within which is a baking chamber which can be square, rectangular, oval or circular, 2 denotes an igniting device, 3 indicates a charging hopper, 4 refers to a charging device, 5 designates wind boxes, 6 designates branch pipes, 7 designates a main exhaust pipe, and 8 designates beams for suspending the wind boxes and a furnace hood 11. The numeral 9 designates a central strut supporting the beams 8, and a metal part 10 serves to fix the beams 8 to the strut 9. Pillars 12 support the beams 8. The numeral 13 denotes a primary dust collector, 14 refers to dust discharging flap valves, 15 designates guide rollers and concurrently drive rollers for supporting and rotating the furnace body 1, 16 indicates the roller shafts, and 17 designates roller guide rails, which are supported by struts 18. The numeral 19 denotes a conveyer, 20 is a head drum for driving the conveyer 19, 21 is a tail drum for the conveyer 19, and 22 designates a product breaking device. The numeral 23 designates a secondary dust collector, 24 designates a fan, 25 designates an exhaust stack, and 41 designates a conveyer for carrying out the baked and broken ore.

Figure 4:
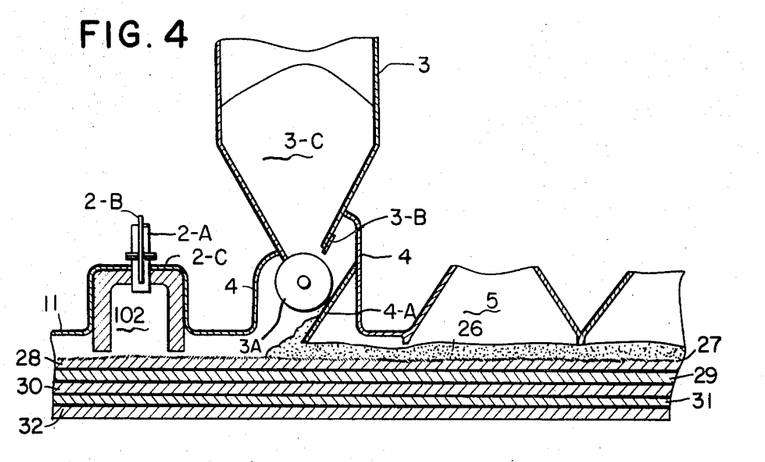
FIG. 4 is a schematic sectional view illustrating the material charging device, igniting device, wind boxes, charged material layers, and so forth in the apparatus embodying the present invention, as shown in FIG. 1.

FIG. 4 is a cross-sectional view illustrating the arrangement of the material charging device, wind boxes, charged material layers, and so forth in the embodiment of this invention to clarify the baking process. The reference numeral 3 designates a material charging hopper, and 3–C is the material. A gate 3–B is provided for adjusting the charging rate, and 3–A denotes a drum feeder for charging the material. The numeral 4 indicates the cover of the charging device, 4–A refers to a material flow-down board, 11 designates a furnace body hood, 5 designates the wind boxes, and 2 designates an igniting furnace (heating furnace). An air pipe 2–A and a gas pipe 2–B constitute an ignition burner. The numeral 26 designates a charge layer to be baked, 27 is a burning surface of a material layer, 28 is a baked material layer still in a red hot state, and 29, 30, 31 and 32 designate baked material layers which are cooled to temperatures which decrease in sequence.

Figure 5:
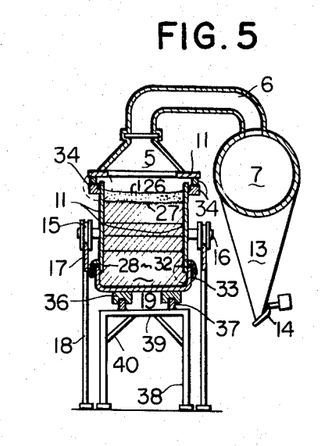
FIG. 5 is an enlarged cross-sectional view of the baking furnace according to this invention as shown in FIG. 1.

FIG. 5 is a cross-sectional view of the baking furnace in the embodiment of this invention. The wind boxes 5 are connected to the main exhaust pipe 7 by means of the connecting pipes 6. The numeral 13 denotes the primary dust collector, 14 indicates the dust discharging flap valves, and 34 designates a sealing device provided between the furnace body 1 and the fixed furnace hood 11. The numeral 26 designates the charged material layer to be baked, 27 designates the burning material layer, and 28 to 32 designate the baked material layers. The numeral 15 designates the guide and drive rollers, 16 designates the shafts of the rollers, 17 designates the guide rails, 18 designates the struts supporting the guide rails, 19 designates the conveyer, 33 designates the fitting portions of the conveyer and the furnace body, 36 designates recessed sliding members fixed to the bottom of the conveyer, 37 designates protruding members, 38 designates conveyer supporting struts, 39 designates conveyer bearing beams, and 40 designates beams reinforcing the struts 38 and beams 39.

Figure 6:
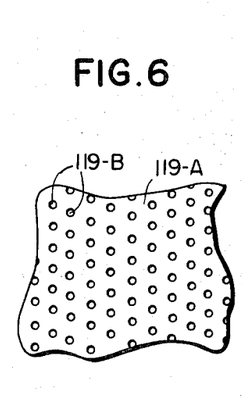
FIG. 6 is a schematic fragmentary view of the conveying pallet for the apparatus of FIG. 1.

FIG. 6 shows the bottom plate 19–A of the conveyer 19. The plate has holes 19–B, through which the air required for baking is forced or sucked upward.

Figure 7:
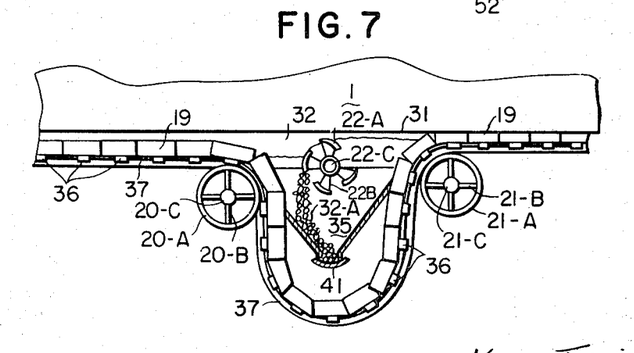
FIG. 7 is a schematic sectional view illustrating the apparatus for breaking and scraping the material baked in the furnace of FIG. 1.

FIG. 7 shows the device for breaking and scraping the baked ore on the conveyer in the embodiment of this invention. The numeral 19 designates the conveyer, 36 denotes the recessed sliding members attached to the conveyer, 37 designates the stationary protrusive sliding members, 20–A designates the tire of the driving wheel, 20–B designates the spokes of the driving wheel, and 20–C indicates the shaft thereof. The numeral 32 designates the baked ore layer subjected to final cooling, 32–A designates the baked ore fragments, 35 indicates a baked-ore receiving hopper, 41 denotes the baked-ore conveyer, 22–A designates the blades of the breaking device, and 22–B designates the spokes and shaft thereof, respectively. The numeral 31 denotes the baked ore left unscraped, and 21–A, 21–B and 21–C designate, respectively, the tire, spokes, and shaft of the tail drum.

Figure 8:
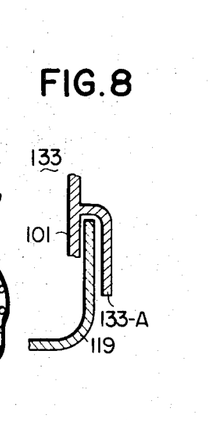
FIG. 8 is a cross-sectional view showing the junction of the pallet side plate and the furnace body side plate of the apparatus of FIG. 1.

FIG. 8 illustrates the details of the engaging portions of the furnace body and the conveyer 19, and 33–A indicates a cover for the conveyer 19, the cover being integral with the furnace body 1.

Figure 9:
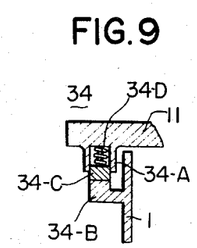
FIG. 9 is a cross-sectional view of the seal portion between the furnace body and hood.

FIG. 9 shows in detail the sealing device 34 between the fixed furnace hood 11 and the rotary furnace body 1, and 34–A denotes the sealing cover, 34–C designates a bar having a sliding surface, 34–D indicates springs forcing the bar 34–C, and 34–B is a sliding bar fixed to the furnace body 1. The bar 34–B slides in airtight contact with the bar 34–C.

The baking process of the present embodiment constructed as described above will be explained hereinafter in conjunction with FIG. 4. The material to be baked is first put into the charging hopper 3 and introduced through the rotating drum feeder 3–A, and the material flow-down board 4–A, into the furnace body 1 rotated by the guide and drive rollers 15 (refer to FIGS. 1 and 2). Normally, the thickness of the newly charged material layer is preferably 200 to 250 mm. The thickness, however, should be determined in accordance with the baking speed and the furnace rotating speed (which is variable and normally about four turns per hour). Since the newly charged material forms a layer having a thickness of about 200 to 250 mm. over the layer of the material charged during the previous turn of the furnace, and because of the employment of upward draft, the burning of the preceding layer shifts to the subsequent layer so that the burning layers always keep their levels, thus allowing the charged material layers to be baked continuously.

Figure 1:
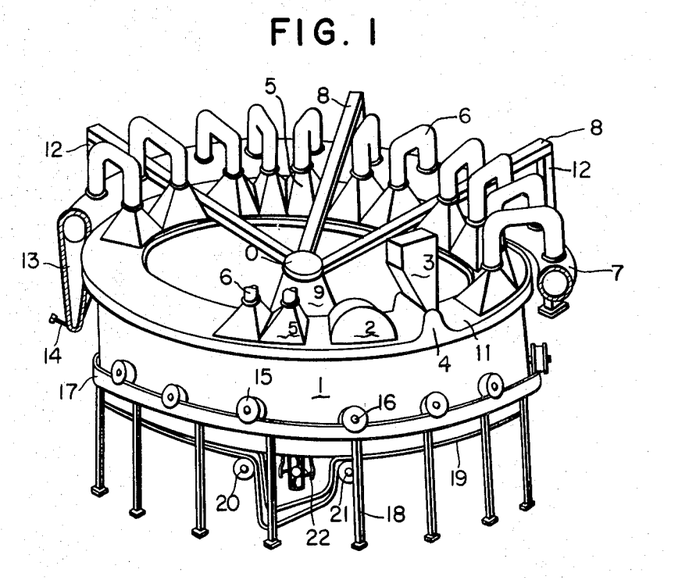
FIG. 1 is a perspective view showing an apparatus embodying the present invention which is particularly suited for sintering powdered ore, pellets and the like for iron production embodying the present invention.
Figure 2:
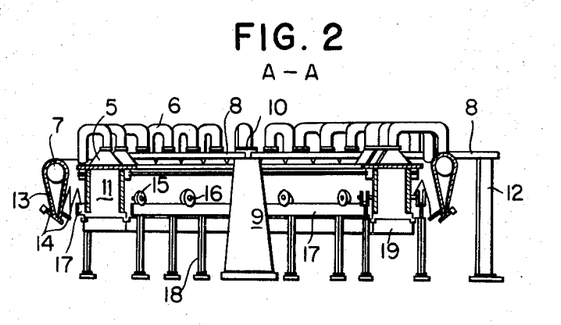
FIG. 2 is a cross-sectional view taken on the line A—A in FIG. 3.

Next, when the ore baked and cooled has rotated around the furnace center one turn while in contact with the conveyer 19, which, as shown in FIGS. 1 and 7, is spirally inclined at a slight angle in the peripheral direction and fixed to the furnace body 1 so as to revolve together with the furnace body, the baked material reaches the breaking device 22 in such a state that said material projects downwardly below the bottom of the furnace body 1 by about 200 to 250 mm. The material projecting as indicated at 32 is broken and scraped by means of the rotating breaking machine 22. The pieces of the broken material drop into the collecting hopper 35 and are collected on the conveyer 41, which carries the product out of the furnace.

The baked material 31 remaining after the scraping of the projecting layer 32 again rides on the conveyer 19 and makes another round, and accordingly projects downward by 200 to 250 mm. just as in the case of the foregoing baked material layer 32. The projection is again scraped. By such scraping as mentioned above, the uppermost material layer is lowered by an amount equal to the thickness (200 to 250 mm.), and therefore, the material to be baked can be added, as the furnace rotates, so as to form the layer 26 having the same thickness. Thus, the furnace always has a uniform thickness of material layers all along the periphery.

Although the thickness of the scraped material has been specified above as about 200 to 250 mm., the thickness is not to be restricted to the exemplary values, but must be determined in view of the thickness of the charged material layers. Besides, as to the relation between the charging position and the breaking and scraping position, the practical embodiment suggests, in a nonlimitative sense, that it is most preferable to provide the breaking device just in front of the charging device in the rotational direction. However, it is necessary to separate the devices sufficiently from each other for the charged material to be free from direct transmission of the vibration due to the breaking operation.

Figure 3:
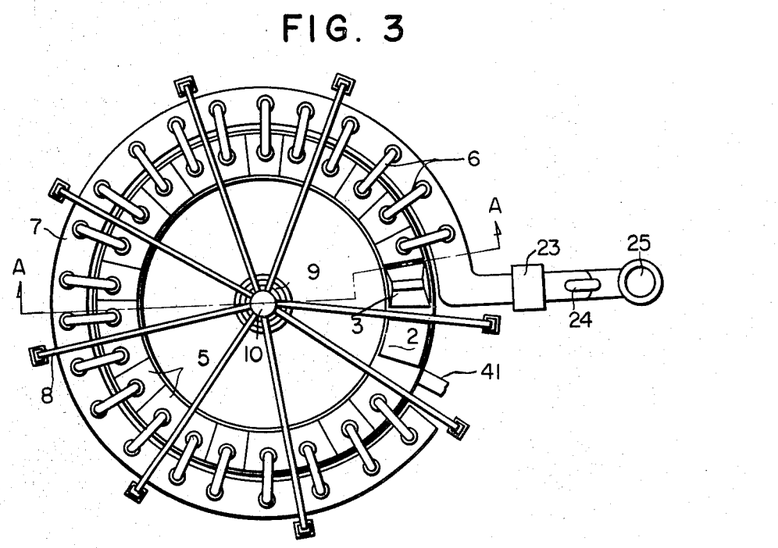
FIG. 3 is a plan view of the apparatus shown in FIG. 1.

The fan 24 is positioned as shown in FIG. 3 to draw out the exhaust gas. The suction of the fan 24 causes the air to pass through the holes 19–B bored in the bottom plate 19–A of the conveyer 19 and through the baked material layers 28 to 32, which heats the air up to a high temperature. The hot air having reached the burning material layers 27 causes the material layers to burn, and the combustion gas passes the material layer 26. The exhaust gas, at 100° C. or below, is sucked through the wind boxes 5, the connecting pipes 6, the exhaust main pipe 7, the primary dust collector 13 and the secondary dust collector 23, into the fan 24 and exhausted through the stack 25.

As is apparent from the foregoing description, this embodiment of the present invention contemplates charging the baking material continuously, and breaking and scraping the baked material at the bottom of the furnace, and further enabling the air to flow upward through the hot baked material so that, while cooling the material, the air is heated to a high temperature before entering the burning layers, thus contributing greatly to fuel saving.

This embodiment of the apparatus according to the present invention, with the above described construction and operation, has the following effects and advantages as compared with the conventional sintering equipment or pellet baking facilities (of the moving grate type, the grate kiln type, and the like).

(a) The building cost is low. (No cooler is necessary.)

(b) The igniting fuel needs to be supplied only while the furnace makes one revolution at the beginning of the operation.

(c) The area of the plant building site may be small.

(d) No cooling equipment is needed, and the air directed toward the burning material layers gets hot while cooling the baked material; therefore, it is possible to economize baking fuel remarkably.

(e) The yield of the baked material can be increased greatly: In the conventional furnaces, the yield of material from the surface layer is reduced markedly and, in addition, the quality (the strength, desulfurization, and so on) is low, whereas the furnace of the present invention allows no surface layer to form, thus being free from such defects as mentioned above.

(f) The present invention requires no equivalent to the grate bars in the conventional furnaces, and the floor plate of the conveyer in the furnace of this invention is equivalent to the floor grating of the cooler. Thus, the present invention gets rid of the burden of the expensive grate bars.

(g) Since the burning material layers are always covered with the newly charged material and therefore never have the upper surface exposed during the operation (it being desirable, of course, to perform automatic operation so as to keep this condition), the temperature at the entrance to the fan is always below 100° C., which is much lower than the conventional fan entrance temperature of 150–200° C. This fact is very profitable in view of furnace design and fan efficiency. Accordingly, the price of the fan required can be very low.

Thus, this embodiment of the present invention has many advantages, and serves to reduce costs greatly.

A coke producing apparatus embodying the present invention is shown in FIGS. 11-18.

In this embodiment, a coal charge is continuously introduced in the form of a layer into a carbonizing chamber in a rotary cylindrical coke oven, which is a feature of the present invention. In such case, the coal charge can be continuously introduced after it has been pressed and molded in the form of circular grains, square grains, strips or fragmental strips. When this preliminary pressing and molding system is adopted, weak caking coal can easily be utilized. The shape of the cross section of the coal raw material introduced in the form of a layer is preferably square, but can be made rectangular, trapezoidal, semicircular or any other shape, by taking into consideration the expansion, contraction and heat transmission at the time of distillation. The thus introduced coal charge will be heated by radiation and conduction heat from the brick walls or the walls made of special heatproof cast steel plates of the carbonizing chamber heated to a red hot state, and will begin to be dry-distilled on the upper surface and both sides. The dry-distillation will begin also on the bottom surface by receiving heat transmission from the carbide in the underlying layer, i.e., the coal charge one layer down, heated by radiation so as to be in a red hot state and already dry-distilled to a considerable degree. Then, while the charge is gradually lowering in the rotating carbonizing chamber, the dry-distillation will progress. When the charge has rotated 6 to 12 revolutions, the dry-distillation will be completely finished. Further, the charge, after it has cooled to some extent, will reach the lowermost part of the oven, will be conveyed on a conveyer provided on the bottom of the oven to a breaking and scraping machine by the rotation of the oven, and will be discharged from the oven after being scraped and broken off by said breaking and scraping machine. The gas produced at the time of the dry-distillation will be sucked upward by making the pressure in a hood above the oven negative (about —20 mm. water).

The proper pressure in the hood is determined by the operating conditions so that no air will come in through the lower part of the oven and no gas produced in the oven will jet out.

In the explanation of this embodiment, for the sake of brevity, a single ring of carbonizing chambers is used. But the number of rings of the carbonizing chambers is not so limited. A plurality of rings can be used. Usually, when about three rings are provided, the productivity and economy will be highest.

Figure 11:
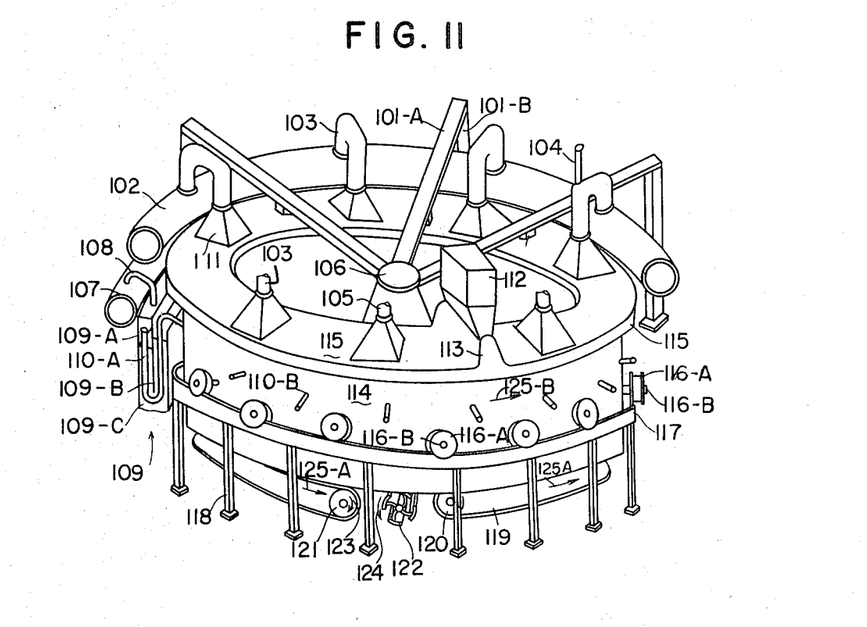
FIG. 11 is a schematic persepective view of coke producing apparatus according to the invention.
Figure 12:
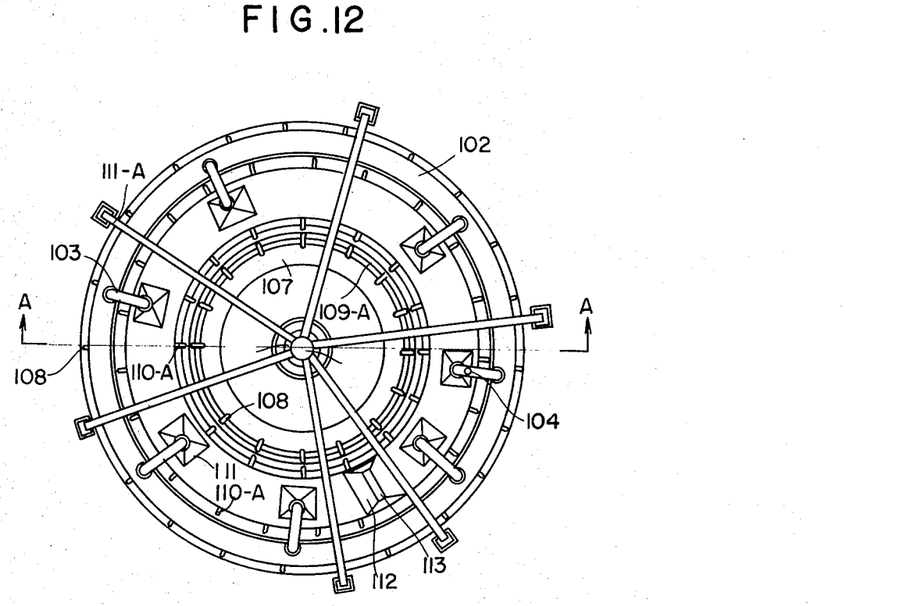
FIG. 12 is a plan view of the apparatus of FIG. 11.
Figure 13:
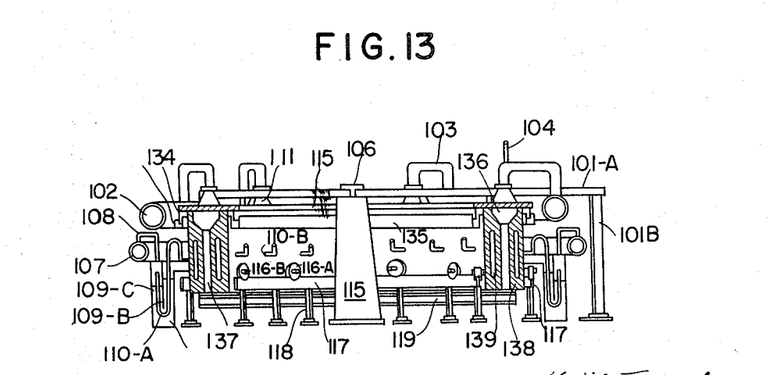
FIG. 13 is a cross section on line A—A of FIG. 12.

As illustrated in FIGS. 11-13, a beam 100A for suspending a hood and charging apparatus above an oven body is supported on a pillar 100B. A metal hanger 100C connects the oven hood 115 and the beam. A dry-distillation gas recovering annular tube 102 surrounds the hood and is connected thereto by gas collecting tubes 103 and gas recovery hoods 111. A gas dissipating tube 104 is provided on one tube 103. A supporting pillar 105 supports the beam 100A at the center of the oven. A pressing metal securing piece 106 secures the beams 100A to the pillar 105. Annular tubes 107 for combustion gases are positioned below annular tube 102 and inside furnace body 114 (see FIG. 14) and are connected by a connecting pipe 108 to liquid-sealing apparatus 109. Each liquid-sealing apparatus has an outer tank 109A, a partition plate 109B, and a sealing liquid 109C. A connecting pipe 110A connects a combustion burner 110B with the liquid-sealing apparatus 109. A hopper 112 for feeding coal raw material is connected to a charging apparatus 113 on the hood 115. a coke oven body 114 under the oven hood 115 is rotatable around pillar 105. Wheels 116A are mounted on shafts 116B on the inside and outside of the oven body. A motor (not shown) can be connected to one or more shafts 116B for driving the oven body. Wheels 116A roll on rails 117 on the inside and outside of the oven body for the rotation of the oven body 114. The rails 117 are supported by supporting pillars 118. A conveyer 119 is provided beneath the oven body 114 and runs around drum 120 at one end of the conveyer and drum 121 at the other end of the conveyer. A coke crusher 122 is provided at the end of the conveyer 119. 123 is an arrow indicating the direction of the rotation of the drum 121 of the conveyer 119 and 124 is an arrow indicating the direction of the rotation of the coke crusher 122. 125A is an arrow indicating the direction of the travel of the conveyer 119. 125B is an arrow indicating the direction of the rotation of the oven body 114. A coal raw material charging chamber 136 and a carbonizing chamber 137 defined between carbonizing chamber walls 138 each having a combustion chamber 139 therein are provided within the oven body 114.

Figure 14:
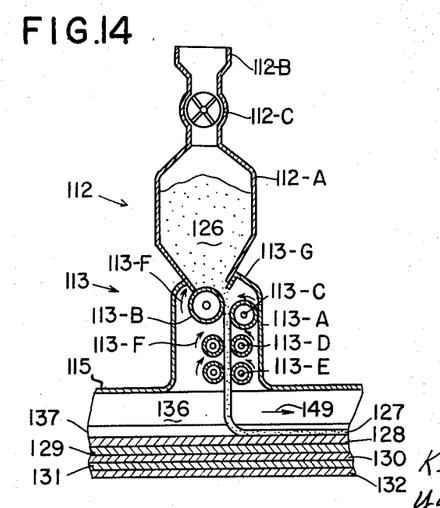
FIG. 14 is a schematic cross section of a charging mechanism for the furnace of FIG. 11.

FIG. 14 illustrates a continuous charging apparatus to be used when charging the coke oven of the present invention and may be considered to be a detailed view of the charging apparatus 113 illustrated in FIG. 11.

The charging apparatus has a coal raw material charging part 112B and an airtight rotary feeder 112C opening into a charging relay tank 112A. The coal raw material is shown at 126. The charging apparatus has a hood 113A and a drum feeder 113B therein for cutting out coal raw material from the bottom of tank 112A. A roller 113C opposed to drum feeder 113B passes coal and feeds it to pressing and molding rollers 113D and 113E. The rollers 113C and 113E are provided and operated when it is necessary to press and mold coal raw material, and can be removed or stopped so as to have no influence on the charge of the raw material when they are unnecessary. 113F is an arrow indicating the direction of the rotation of the drum and roller. A gate 113G is provided for adjusting the amount of the discharge of coal raw material. Layers represented by numerals 127–132 will be spirally fed, and will gradually be lowered and carbonized. In 6 to 10 rotations the layers will be completely coked and will be discharged.

Figure 15:
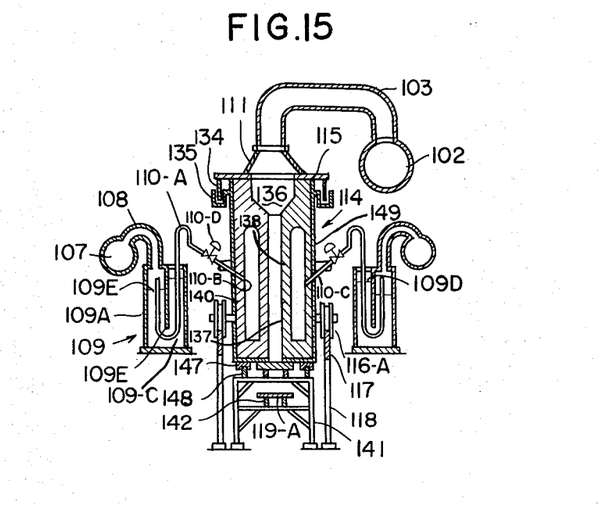
FIG. 15 is a schematic cross section of the baking oven part of the furnace of FIG. 11.
Figure 16:
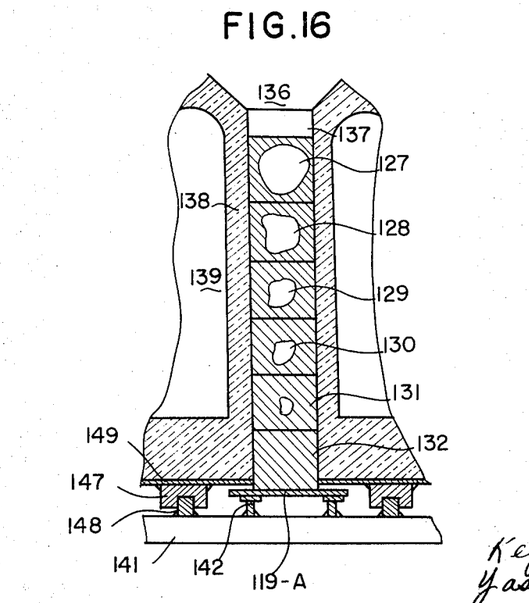
FIG. 16 is a cross section showing the process of baking in the apparatus of FIG. 15.

FIGS. 15 and 16 are detailed cross sections of this embodiment of the apparatus. FIG. 15 shows the relationship of the oven body 114, liquid-sealing apparatus 109 and gas collecting tube 103. A sealing plate 134 is secured to the hood 115 for the oven body with the lower edge in a sealing plate receiving groove 135 secured to the oven body 114.

The brick oven wall is shown at 140. A support 141 is provided for the conveyer 119 and sliding track 142 is provided for the conveyor 119 and secured to the support 141. A concave track 147 is provided for holding the oven body and is secured to the bottom of an iron shell 149 around the oven body 114. Concave track 147 slides on a convex track 148 secured to the support 141. A control valve 110D is provided in connecting pipe 110A for adjusting the combustion gases. An air pipe 110C is provided for combustion air. FIG. 16 is a cross section showing the carbonizing process in the apparatus of the present embodiment. It is a typical embodiment operated with six coal charge layers. It shows a state wherein several tens of minutes have elapsed after the charging of the uppermost layer 127 and the coking of the hatched parts has progressed. It is shown that, in the lower layers 128, 129, 130, etc., the coking has progressed so much that the central uncoked part in the layer 131 is substantially zero and the layer 132 is completely coked. In such case, the number of rotations of the oven body was 0.7 revolution/hour, and the carbonizing time was about 85 hours. The thickness of the charge layer and the thickness in the horizontal direction were both made 0.4 meter. The diameter of the oven was 20 meters. The effective height of the carbonizing chamber was 3 meters. The capacity of the oven was about 200 tons/day.

Figure 17:
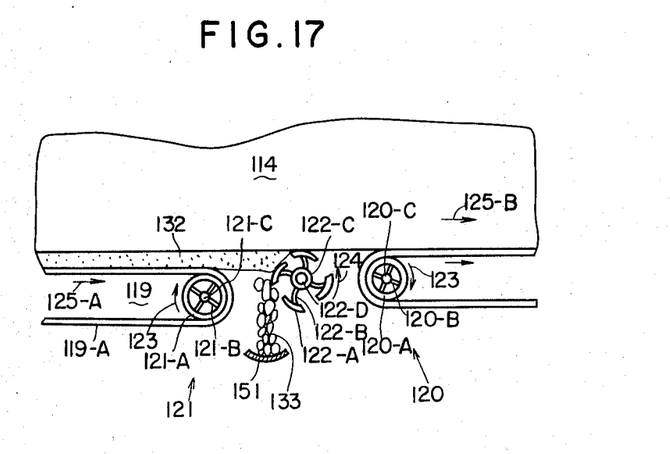
FIG. 17 is a schematice view of the portion of the apparatus for breaking, scraping and conveying the material from the bottom of the oven part in the furnace of FIG. 11.
Figure 18:
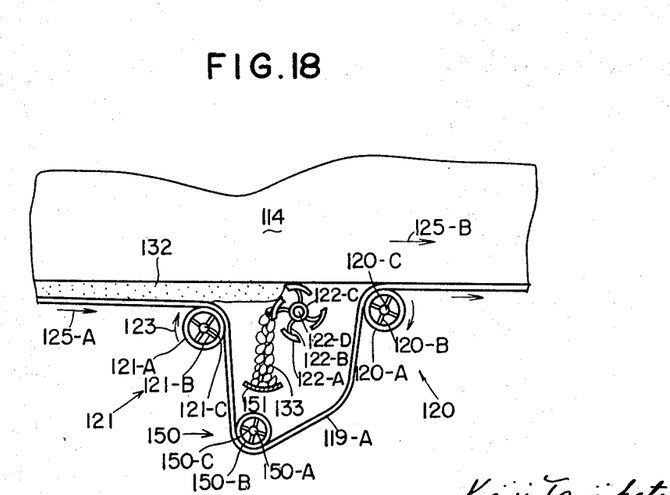
FIG. 18 is a view similar to FIG. 17 of another embodiment of that portion of the apparatus.

Illustrated in FIGS. 17 and 18 are coke removing apparatus for a rotary continuous coke baking oven according to the present invention. The apparatus illustrated in FIG. 17 has a return conveyor wherein a conveyor belt 119A of the conveyor 119 is reversed around the drum 120, and the drum 121. In the aparatus illustrated in FIG. 18, the conveyor belt 119A of the conveyor 119 turns around the lower part of the coke removing apparatus, and there is no return conveyor.

The apparatus is positioned below the oven body 114 rotating in the direction of the arrow 125B and conveyor 119A feeding coke 132 which is broken away at 133 and falls on coke conveyor 151. The conveyor belt 119A is made of metal and runs around tire 120A on spokes 120B mounted on shaft 120C. Drum 121 has tire 121A, spokes 121B and shaft 121C, arrows 123 indicating the directions of rotation of the drum 121 and 120A, cutter 122A is mounted on spokes 122B on a hub 122C and a shaft 122D, which together form the coke removing apparatus. In the above mentioned structure, the conveyor belt 119A is in contact with the oven bottom above the drum 20 and is inclined in the direction of the advance so as to be lower than the oven bottom by an expected clearance, for example the thickness of the charge layer (dry-distilled layer 132) in the carbonizing chamber above the drum 121. That is to say, as the coke layer 132 rests on the conveyor belt 119A, it will lower gradually due to its own weight so as to be exposed below the bottom part of the oven body 114 as shown by 132 in FIGS. 17 and 18. As the oven body 114 and the conveyor belt 119A travel in the direction indicated by the arrows 125B and 125A at a synchronized velocity, if the coke removing apparatus 122 is rotated in the direction indicated by the arrow 124 in a fixed position, the coke 132 exposed below the oven bottom will be cut off by the cutter 122A. The coke 133 thus cut off will be conveyed away by the conveyor belt 151 moving in the direction of the center line of the oven body.

Both the apparatus shown in FIG. 17 and in FIG. 18 have the same function. However, in the one shown in FIG. 18, the conveyor belt 119A continuously passes below the coke conveyor 151. For that purpose, a tension drum 150 is provided therebelow. Said tension drum 150 comprises a shaft 150A, tire 150B and spokes 150C.

In operation, first of all, coal raw material is fed into the charging hopper 112 by a belt conveyor or a bucket elevator or the like. It is desirable that the capacity of the hopper be about twice as large as the amount of production. The coal raw material fed into the charging hopper 112 will be fed into the charging relay tank 112A through the airtight rotary feeder 112C through the charging port 112B, as illustrated in FIG. 14. It is desirable that the amount of the coal raw material 126 in said relay tank 112 be automatically adjusted by a weighing machine installed in the relay tank 112A.

The coal raw material 126 fed in the relay tank 112A will be gradually taken out when the roll feeder 113B is rotated in the direction indicated by the arrow. The amount taken out will be adjusted by the gate 113G. The coal raw material 126 taken out of the roll feeder 113B will be pressed and molded by the rotation of the pressing and molding rollers 113C, 113D and 113E and will be fed into the oven. The thus fed coal raw material will have been pressed to a desired layer thickness, for example about 0.4 meter, by the pressing and molding rollers 113C, 113D and 113E and will, therefore, remain in the shape of a layer such as the layer 127 in the oven.

The coal raw material 126 is fed into the carbonizing chamber 137 through the raw material coal charging chamber 136 above the carbonizing chamber, and since the oven body 114, including the carbonizing chamber 137, rotates gradually, the charge layer 127 will gradually travel in the direction indicated by the arrow 149. But, because the charging apparatus 113 on the oven hood 115 is fixed together with the hopper 112, the coal raw material will be fed in the form of a layer into the carbonizing chamber 137. The rotation of the oven body 114 is carried out by the motor driving one of the wheels 116A. Any other convenient driving system can be used and it is not limited to the one mentioned above.

As the carbonizing chamber wall 138 is in a red hot state, being heated from the combustion chamber 139, the coal raw material fed into the carbonizing chamber 137 will soon begin to be dry-distilled. As shown in FIG. 16, the dry-distillation will progress in the successive layers 127, 128, 129, 130 and 131, and, when the layers are finally discharged, they will have been completely dry-distilled as shown in the layer 132. It is desirable to taper the carbonizing chamber 137 so that it expands downwardly so that the fall of the charge in the carbonizing chamber will be easy.

As the dry-distillation is carried out as shown in FIG. 16, all the gases produced in the dry-distillation will be sucked upward, will pass through the conduit tube 103 through the collecting hood 111 and will be collected in the annular tube 102. In such case, the pressure in the charging chamber 136 is made negative, high temperature dry-distillation gases produced in the layers 131, 130, 129, 128 and 127 will rise upwardly. Therefore, heat will be transmitted from the lower layer to the upper layer and the thermal efficiency will be high.

A newly introduced charge layer will, during its first revolution, receive on the lower surface heat transmitted as described above and its sides and two surface layers will be in a red hot state due to the radiated heat from the carbonizing chamber walls 138, and will be dry-distilled to some extent so that the surface layer will be turned to red hot coke. Therefore, the next new charge layer introduced onto said charge layer will receive heat therefrom and will begin to be preheated, dried and dry-distilled.

As described above, the upper layer will begin to be dry-distilled by the radiated heat from the carbonizing chamber walls. Needless to say, both sides of the charge will be heated directly from the carbonizing chamber walls 138. Therefore, the dry-distillation of both sides will progress at a velocity higher than the upper and lower surfaces.

As the conveyer 119 is operated at the same velocity as the rotating velocity of the oven body 114 at a slight inclination, such as an angle of about 25 minutes where the diameter of the oven is 20 meters as shown in FIGS. 17 and 18, when the dry-distillation has progressed and the contents of the oven have moved downwardly to the final lowermost layer as described above, a clearance such as, for example about 350 mm. between the bottom part of the oven body 114 and the conveyer drum 121 will be filled by the coke contents projecting out of the bottom of the oven. Therefore, if the teeth 122A of the cutter 122 are set adjacent to the bottom part of the oven body 114 and are rotated in the direction indicated by the arrow 124, the projecting layer will be broken and scraped off. Though the layer scraped off is, for example 350-mm. thick, it should be selected to correspond with the thickness of the charge layer. It is desirable that the scraping position be somewhat ahead of the charging position relative to the direction of rotation. This is to prevent the vibrations occurring at the time of scraping from being transmitted to the charge layer and is not essential.

The broken and removed coke will be discharged from the oven and will be conveyed as required to a cooling location or to a storing location in a plant which will use the coke.

In the explanation of the present embodiment, for the sake of brevity, the number of layers has been shown as six. However, if the height of the oven is made larger, the number of layers spirally stacked can be increased, and the productivity can be remarkably increased. Needless to say, if the diameter is made larger, the same effect can be produced. But in such case, the thermal efficiency will be lower than in the former case.

The recovered gas will be sent to a gas cooler through the dry-distillation gas recovering annular tube 102, and will be treated in the same manner as in a conventional coke oven.

When it is necessary to dissipate gases, it will be possible to dissipate them through the gas dissipating tube 104.

The carbonizing chamber walls 138 are heated from the combustion chamber 139. It is best to use a liquid-sealing apparatus 109, as illustrated in FIG. 15, to introduce the combustion gas into the combustion chamber 139. However, the invention is not limited to such a system. FIG. 15 shows just one example wherein the connecting pipe 108 branching from the fixed annular tube 107 for combustion gases is connected to the tank 109A of the liquid-sealing apparatus, the partition plate 109B is provided in said tank 109A and the liquid 109C fills the tank. The U-shaped chamber formed by the partition plate 109B is thus filled with the liquid 109C. The liquid surface of one chamber 109D is open, but the liquid surface of the other chamber 109E is sealed. The combustion burner connecting pipe 110A curved in a U-shape is inserted through said open part 109D so that its forward end projects above the level of liquid in the sealed part 109E. The connecting pipe 110A connected to the combustion burner will thus travel with the rotation of the oven body so that the combustion gas fed through the connecting pipe 108 can be smoothly fed to the burner 110B.

The control valve 110D is set to adjust the burning rate of the burner 110B.

On the other hand, air for combustion is fed through the combustion air pipe 110C. Though not illustrated in the drawing, such combustion air can be heated by a heat-exchanger provided in the oven body. Needless to say, a valve for regulating the amount of air is required so that the air for combustion can mix with the combustion gas in the proper ratio.

The waste gas from the combustion in the combustion chamber 139 can be exhausted from the oven through a heat-exchanger, as is described above though not illustrated in the drawing.

The above mentioned heat-exchanger is not essential. Even if it is not provided, the object of the present invention can be attained.

In the conventional noncontinuous process, the capacity of the coke oven is limited and there have been many obstacles to automation. The present embodiment of the invention makes the coke oven continuous, the carbonizing condition in the carbonizing chamber is very uniform, the conditions in the carbonizing chamber vary little and a stable operation is obtained. Further, as heat is applied from both sides by radiation and also from the upper surface and bottom surface by conduction, the carbonizing time is greatly reduced. Further, as dry-distilled coke is continuously removed, a remarkable increase in the efficiency can be obtained.

Further specific advantages are that:

(1) The coke oven equipment cost is low compared with the cost of conventional equipment for the same amount of production;

(2) Because the system in continuous, the thermal efficiency is high;

(3) Because it is possible to continuously feed coal raw material pressed and molded as required, it is easy to utilize weak caking coal;

(4) Because the amount of gas produced is always uniform, smoke generation can be greatly reduced; and (5) Automation is easy.

What is claimed is:

1. An apparatus for continuous baking of raw materials for producing iron, coal for coke and the like, which apparatus comprises, in combination, a hood, a device on top of said hood for charging material to be baked and a further device on top of said hood for discharging the exhaust gas produced by baking raw material, an annular furnace body rotatably mounted under said hood in airtight engagement with the hood and having a chamber for baking raw material, a conveying device provided immediately under the bottom annulus of said furnace body and movable with the rotation of the furnace body and being spirally inclined downwardly in the direction of rotation of the furnace body from an upper end to a lower end spaced in the direction of the annular furnace body from the upper end, and a material cutting device provided just beyond the end of the conveying device at the lower end of the inclined conveying device between the lower and upper ends and projecting upwardly from beneath the level of the lower end of the conveying device for performing cutting action for cutting material from the bottom of a layer of baked material coming off said conveying device.

2. An apparatus as claimed in claim 1 in which said conveyer has a plurality of air holes therein, whereby the apparatus is particularly suited for sintering of granular raw materials for producing iron.

3. An apparatus as claimed in claim 2 wherein the shape of the baking chamber is square, rectangular, oval, or semicircular.

4. An apparatus as claimed in claim 2 in which said conveying device has a bottom plate and said large number of air holes are in said bottom plate.

5. An apparatus as claimed in claim 1 in which said furnace body has a plurality of rollers attached thereto along the periphery thereof, and rails and struts supporting said rail around said furnace body and on which said rollers roll.

6. An apparatus as claimed in claim 1 in which said device for charging raw material is spaced around said furnace from said material cutting device.

7. An apparatus as claimed in claim 1 in which said conveyer is a sectionalized conveyer and extends sharply downwardly at a point adjacent and just preceding said cutting device, and then upwardly just beyond the cutting device, said cutting device comprising rotatable cutting means cutting away the bottom of the baked material.

8. An apparatus as claimed in claim 1 in which said annular furnace body has gas burning chambers on opposite sides of said at least one annular baking chamber defining said baking chamber therebetween, and means for feeding a combustion gas and air to said gas burning chambers coupled to said annular furnace body for heating the baking chamber for making coke.

9. An apparatus as claimed in claim 8 in which said means for feeding a combustion gas to said gas burning chambers comprises a fixed combustion gas annular tube around the inside and outside of said annular furnace body, an annular liquid seal means coupled to each said combustion gas tube, and combustion gas feed tubes attached to said annular furnace body and opening into said gas burning chambers and extending into said liquid seals and opening therethrough so as to be in communication with said annular tubes, the feed tubes being movable along said annular liquid seal means to remain sealed from the atmosphere during rotation of the annular furnace body.

10. An apparatus as claimed in claim 9 in which said annular liquid seal comprises an annular trough, an annular partition dividing said trough into an inner annular portion and an outer annular portion and having the lower edge spaced from the bottom of said trough, the outer annular portion being closed to the atmosphere and connected to said annular combustion gas tube, and said feed tube being U-shaped at the free end thereof and extending under said partition and upwardly adjacent the top of said outer annular portion, whereby when the trough is filled with a sealing liquid, the end of the tube will project above the level of the liquid in the outer annular portion and the tube can move along the annular trough during rotation of the furnace body.

References Cited
UNITED STATES PATENTS
| | | | |
|---|---|---|---|
| 1,433,354 | 10/1922 | Dwight | 266—21 |
| 1,940,935 | 12/1933 | Bennett | 266—21 X |
| 2,955,991 | 10/1960 | Tufty | 202—117 |
| 3,302,936 | 2/1967 | Ban | 266—21 X |

FOREIGN PATENTS
864,323  1/1953  Germany.

J. SPENCER OVERHOLSER, Primary Examiner

R. S. ANNEAR, Assistant Examiner

U.S. Cl. X.R.

263—28; 202—117, 262; 201—32